June 29, 1943.  M. A. GILMAN ET AL  2,323,215
SOUND RECORDER AND REPRODUCER
Filed Aug. 5, 1939  9 Sheets-Sheet 4

June 29, 1943.　　　M. A. GILMAN ET AL　　　2,323,215
SOUND RECORDER AND REPRODUCER
Filed Aug. 5, 1939　　　9 Sheets-Sheet 5

June 29, 1943.  M. A. GILMAN ET AL  2,323,215
SOUND RECORDER AND REPRODUCER
Filed Aug. 5, 1939  9 Sheets-Sheet 6

June 29, 1943.  M. A. GILMAN ET AL  2,323,215
SOUND RECORDER AND REPRODUCER
Filed Aug. 5, 1939  9 Sheets-Sheet 8

Inventors:
Morris A. Gilman
Carl Anderson
By Chritton, Wiles, Davies, Hirsch and Dawson
Attorneys.

June 29, 1943.  M. A. GILMAN ET AL  2,323,215
SOUND RECORDER AND REPRODUCER
Filed Aug. 5, 1939   9 Sheets-Sheet 9

Patented June 29, 1943

2,323,215

UNITED STATES PATENT OFFICE 2,323,215

SOUND RECORDER AND REPRODUCER

Morris A. Gilman, Chicago, and Carl Anderson, Oak Park, Ill., assignors to Actino Laboratories, Inc., a corporation of Illinois Application August 5, 1939, Serial No. 288,668

3 Claims. (Cl. 88—18.7)

This invention relates to a sound recorder and reproducer and more particularly to a mechanism for recording and reproducing sound on film.

One object of this invention is to provide an improved mechanism for feeding an endless ribbon of sound film through a recorder or reproducer mechanism. Another object is to provide a reel receiving a plurality of layers of film and adapted to feed the film from the inner layer to a recording or reproducing mechanism which is positioned out of the plane of the reel. Still another object is to produce an improved mechanism for embossing a sound groove in a film. Yet another object is to provide, in connection with a sound film having a plurality of sound grooves therein, a mechanism for laterally shifting the stylus of the recorder or reproducer mechanism from one groove to the next. A further object is to provide an automatic and noiseless mechanism for step by step lateral shifting of the stylus of the recorder or reproducer mechanism in engagement with the film.

Other objects and advantages will be apparent from the following specification and drawings, in which.

In the specific embodiment of our invention described herein, the recorder and reproducer mechanism is carried on a plate A. B designates the mechanism for feeding the film to the recorder and reproducer. The film and reel are driven by a drive mechanism C, and a step by step shifting mechanism D causes the stylus of the recorder or reproducer to move laterally across the film.

The entire mechanism is supported by a housing 10 equipped with a base 11, a front wall 12, end walls 13 and 14, a removable rear wall 15, and a top wall 16. The top wall 16 may carry supports 20 for a member 17 which is provided with beveled edges 18 and 19.

Figure 1:
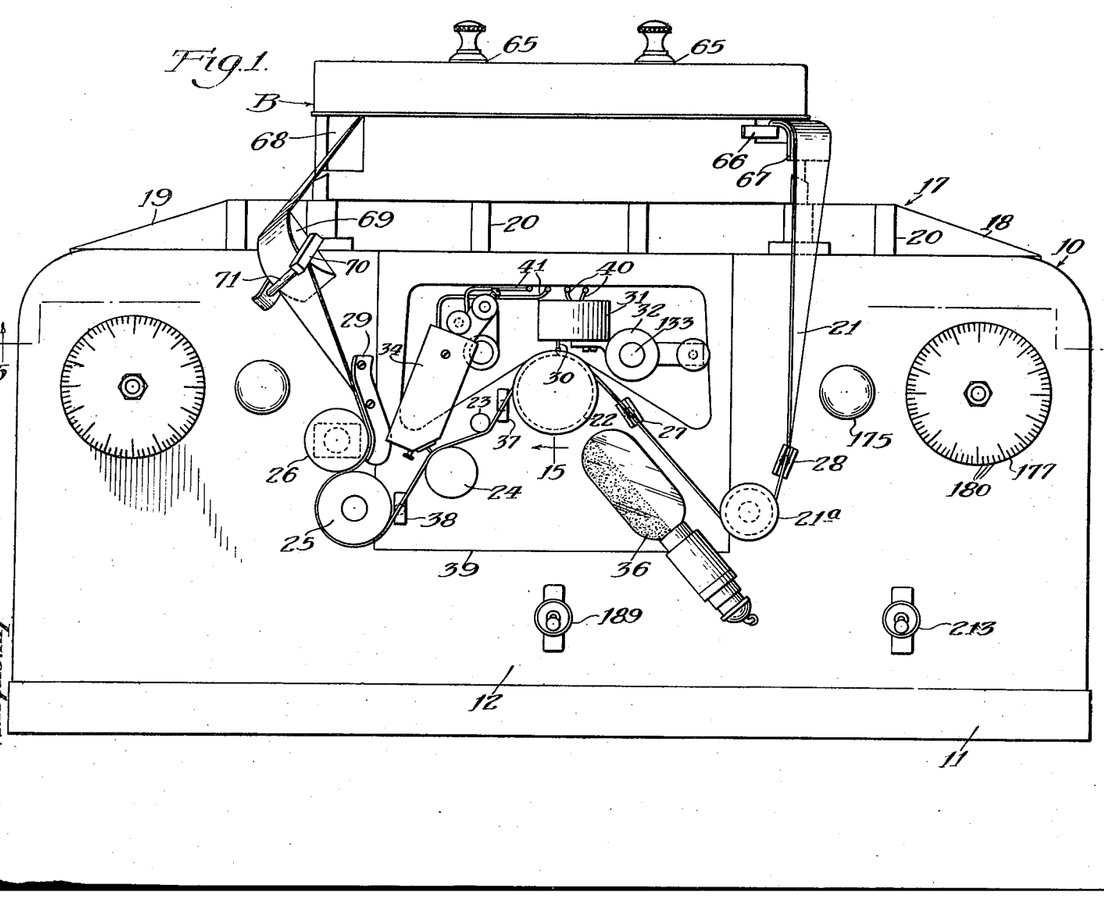
Fig. 1 is a front elevational view of my improved mechanism.

Referring particularly to Fig. 1, the front wall 12 carries a rectangular plate 39 which, in turn, supports the plate A which may be resiliently mounted therein. The film 21, moving from the feed mechanism B, travels on a path along a face of the plates 39 and A and is guided and driven along this path by a series of rollers. The film first passes over the idling roller 21ª, then to the anvil 22, the guide roller 23, and the stationary roller 24 to the drive roller 25. The film moves between the drive roller 25 and the clutch roller 26 and returns to the feed mechanism B. All of these rollers are in alignment and serve to guide the film 21 throughout its path of travel.

Wipers 27 and 28, suitably mounted on the front wall 12 or the plate 39, preferably engage the film before it reaches the anvil 22, and a guide strip 29 receives the film as it leaves the clutch roller 26. As the film 21 passes over the anvil 22, it is engaged by the embossing stylus 30 of the recorder mechanism 31 which is pivotally mounted on the shaft 32 in the plate A. Similarly, as the film travels over the stationary roller 24, it is brought into contact with the stylus 33 of the reproducing mechanism 34.

The drive roller 25 is equipped with a rubber or other frictional surface 35, in order to provide a frictional engagement with the film 21. The clutch roller 26 may, although not so shown, be similarly equipped. A small light bulb 36 or other suitable heating element may be mounted on the front wall 12 adjacent the film 21 and the anvil 22. Two projecting switch pins 37 and 38 yieldably engage the edge of the film and serve to actuate the lateral step by step shifting of the recorder and reproducer mechanism, as will later be described.

The film 21 may be of any suitable material for recording and reproducing sound on film, such, for example, as a cellulose acetate ribbon. The film 21 is preferably in the form of a continuous endless ribbon, which may pass from the feed mechanism B through the recorder and reproducer back to the feed mechanism.

The recorder 31 may be of any suitable or convenient type adapted to convert variations in electrical current of audio frequencies into the movement of the stylus 30. Our improved mechanism is particularly adapted for use with a recorder in which the stylus 30 is adapted for lateral undulatory movement. The wires 40 serve as connections to the microphone and other means used for converting sound into variations in electrical current. Since these means are well known, they are not shown or described herein.

The reproducer mechanism 34, which may be of any suitable form, is adapted to convert vibrations picked up by the stylus 33 into variations of electrical current which, in turn, may be converted into sound by any of the numerous well known means therefor (not shown) connected to the reproducer mechanism by the wires 41. Since reproducers of this type are well known in the art, a detailed description herein is believed unnecessary.

As seen particularly in Figs. 12 to 15, the engagement of the stylus 30 of the recorder 31 with the film 21 causes the embossing of a longitudinal groove 42 in the film. The stationary anvil 22 is provided with a single lateral or transverse groove 43 beneath the point at which the stylus engages the film, thereby aiding the embossing of the film in the formation of the groove. The anvil 22 is provided with means for maintaining the film in position thereon.

Figures 12, 13, 14, 15:
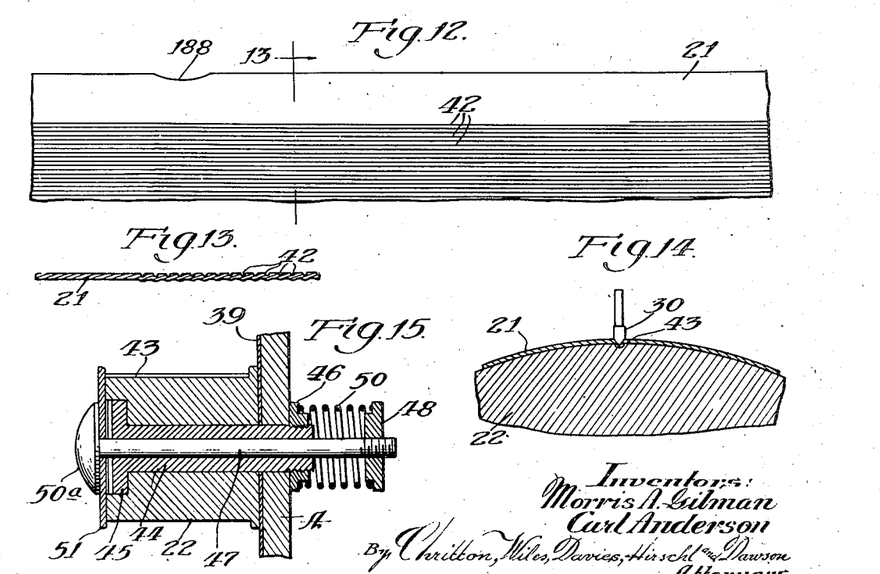
Fig. 12 is a plan view of a portion of the film showing the longitudinal grooves therein.
Fig. 13 is a sectional view taken along the line 13 of Fig. 12.
Fig. 14 is a fragmentary, transverse sectional view of the anvil with the film in position thereon engaged by the stylus of the recording mechanism.
Fig. 15 is a fragmentary, vertical sectional view showing the anvil.

A bolt 44, provided with a head 45, is received within a central aperture in the anvil. A boss 46, threadedly secured to the end of the bolt 44, retains the head 45 of the bolt tightly against the anvil and the anvil in closely fitting position against the plate 39. The bolt 44, in turn, is centrally apertured to receive a smaller bolt 47, the end of which is threadedly engaged by a member 48, the whole assembly being supported outside the housing 49. The member 48 is yieldingly urged away from the boss 46 by the spring 50. The head 50ª of the bolt 47 urges a flat circular washer 51, the edges of which extend beyond the anvil 22, against the body thereof, retaining the film in position and alignment thereon.

Figure 2:
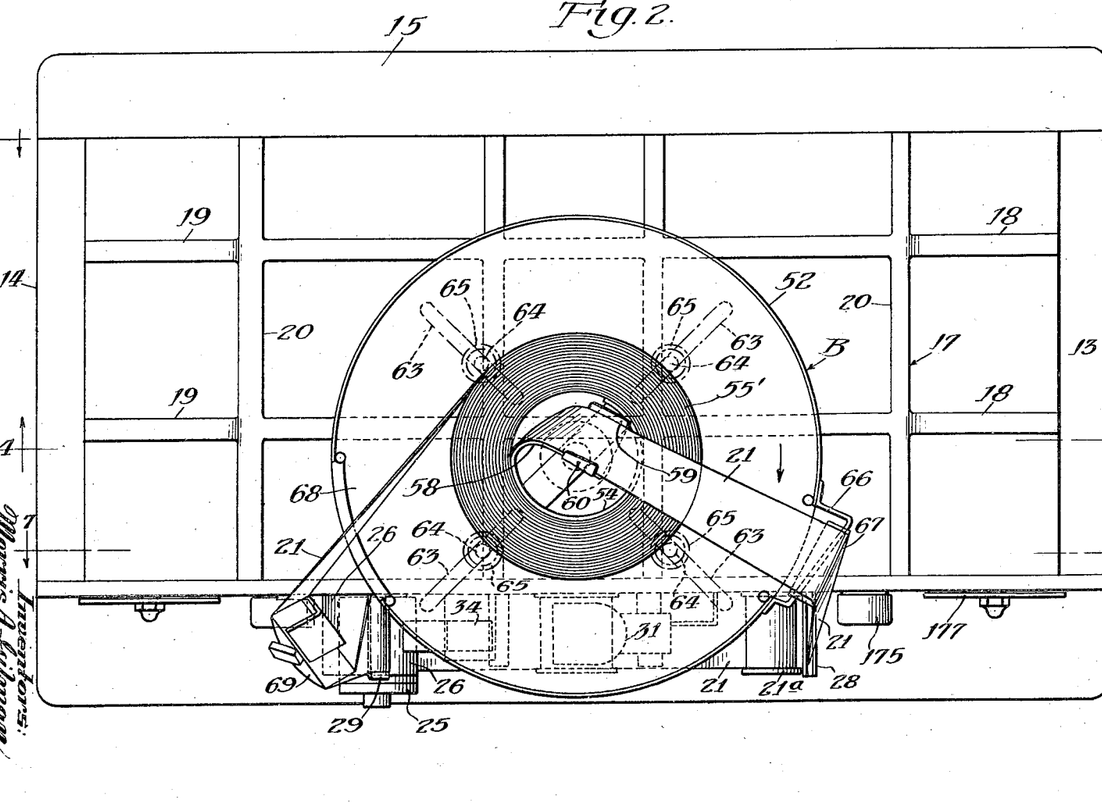
Fig. 2 is a plan view with the cover of the feed mechanism broken away to show the reel and film thereon.
Figure 4:
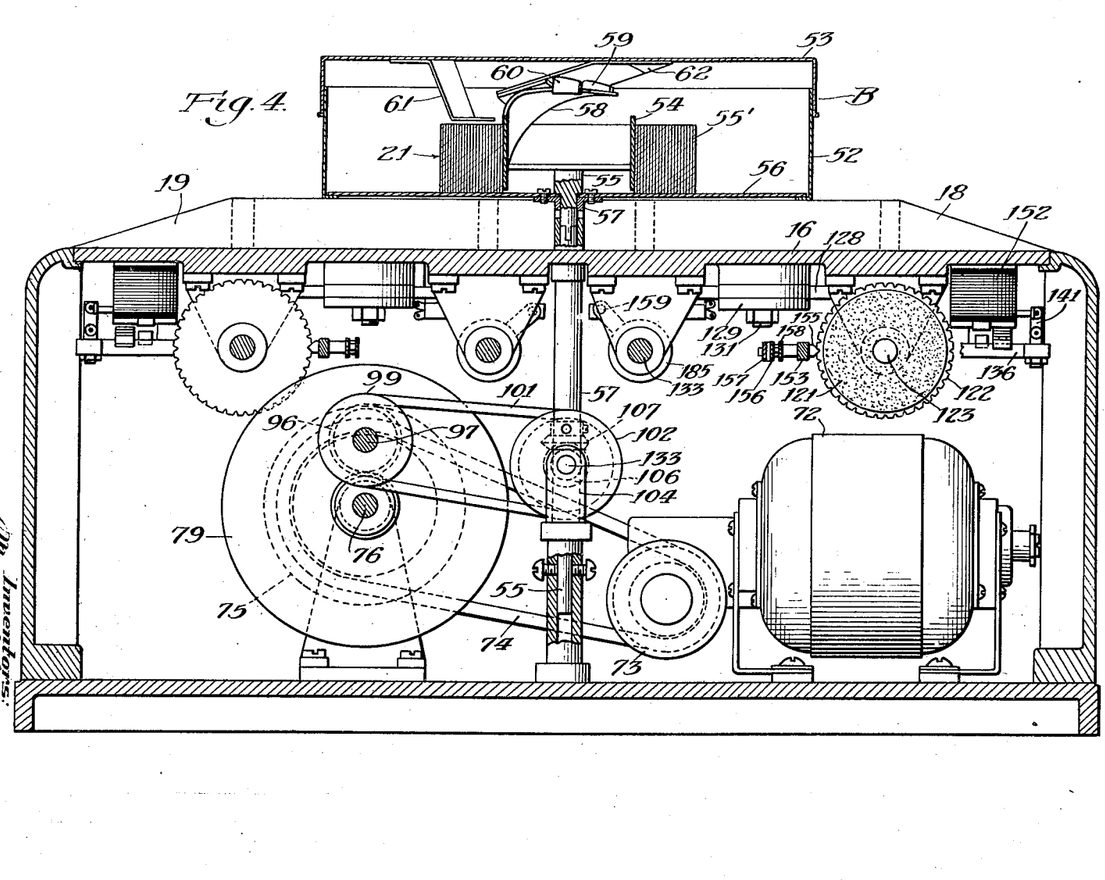
Fig. 4 is a longitudinal sectional view taken along the line 4 of Fig. 2.

The film 21 preferably consists of an endless ribbon which is received in a plurality of wound layers within the feed mechanism B, as shown particularly in Figs. 2 and 4. A casing 52, carrying a lid 53, encloses the reel 54 which is fixedly mounted on top of the stationary shaft 55. The film 21 is wound around the reel 54 in a plurality of layers 55' and supported on the rotatable base plate 56 carried by the hollow shaft 57. A portion of the reel 54 is turned upwardly and laterally to provide a guide member 58, the end of which preferably projects in a horizontal plane substantially perpendicular to the axis of the reel 54. The guide member 58 may be equipped near its end with the inwardly turned flanges 59 and 60.

Strips 61 and 62 may be attached to the under surface of the lid 53 and serve to retain the film in position on the reel 54 and guide member 58. If desired, the lid 53 may be provided with radial slots slidably receiving pins 64, which project downwardly to the base 56 and act to retain the film in tightly wound position. The pins 64, being slidable in the slots 63, may be adjusted to accommodate a varying number of layers resulting from the use of different lengths of film and may be secured in a given position by tightening the nuts 65.

At one side of the casing 52 a bracket 66 carries a downwardly curved guide 67, while on the other side a portion of the casing is cut away at 68, providing an aperture through which the film is received into the casing. On the front wall 12 a bracket 69 supports arcuate guide members 70 and a rod 71, which cooperate to guide the film to the recess 68.

Figure 3:
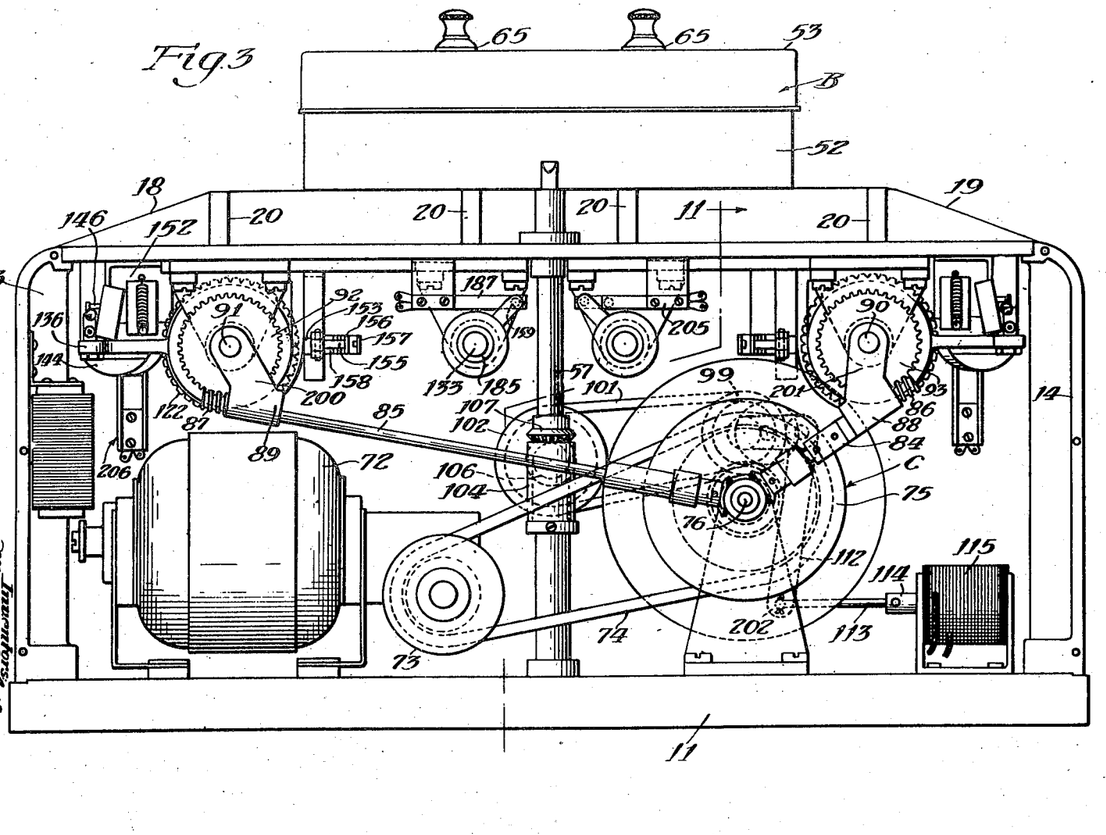
Fig. 3 is a rear elevational view with the back plate of the housing broken away to show the mechanism therein, this view being taken from the line 3 of Fig. 2.
Figure 11:
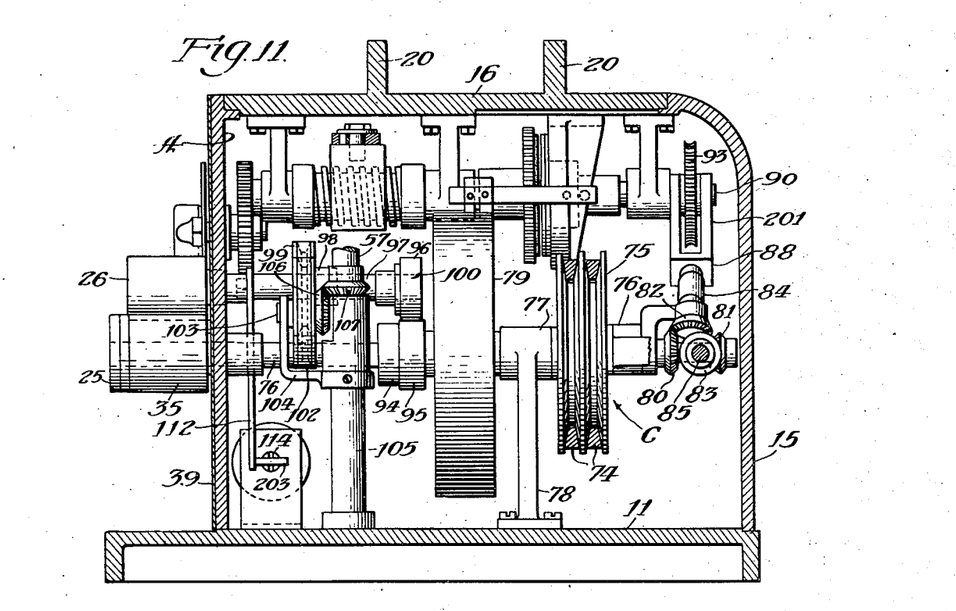
Fig. 11 is a vertical sectional view taken along the line 11 of Fig. 3.

As seen particularly in Figs. 3, 4 and 11, the drive mechanism C is actuated by a motor 72, which drives pulley 73 connected by an endless cord 74 to a second and larger pulley 75. Pulley 75 is preferably of the double groove type and is fixedly mounted on the drive shaft 76.

As seen in Fig. 11, the drive shaft 76 is rotatably mounted on the bearing surface 77 of the bracket 78. The bracket 78 may be supported on the base 11 in any suitable manner. A fly wheel 79 steadies the action of the drive shaft. At one end the shaft 76 carries a pair of opposed bevel gears 80 and 81, which mesh with the bevel gears 82 and 83, respectively, to continuously drive the shafts 84 and 85 while the motor 72 is in operation.

Referring once more to Fig. 3, the shafts 84 and 85 are equipped at their ends with worm gears 86 and 87 rotatably supported in sleeves 88 and 89 carried by the brackets 200 and 201 journaled on the shafts 90 and 91. The worm gears 86 and 87 are so arranged as to mesh with the gears 92 and 93, driving the shafts 90 and 91, to which the gears 92 and 93 are fixedly attached.

The other end of the main drive shaft 76 extends through the front wall 12 and carries the drive roller 25. Adjacent the fly wheel 79 a roller 94, equipped with an anti-friction face 95 of rubber or similar material, is mounted. The rubber face 95 engages the surface 100 of the driven roller 96 on the shaft 97. The bracket 98 supports the shaft 97 and is so arranged as to permit vertical slidable movement as well as rotation thereof. A pulley 99 is also carried by the shaft 97.

As seen particularly in Figs. 4 and 11, the pulley 99 is connected by belt 101 to a second pulley 102 on the shaft 103. The pulley 102 is supported by the bracket 104 carried by the base fixed shaft 105 which is secured to the base 11. The movement of the pulley 102 on the shaft 103 drives the bevel gear 106 and a second bevel gear 107 meshing therewith. The shaft 105 is provided with a rotatable upper extension 57 on which the bevel gear 107 is mounted.

Figures 6, 7:
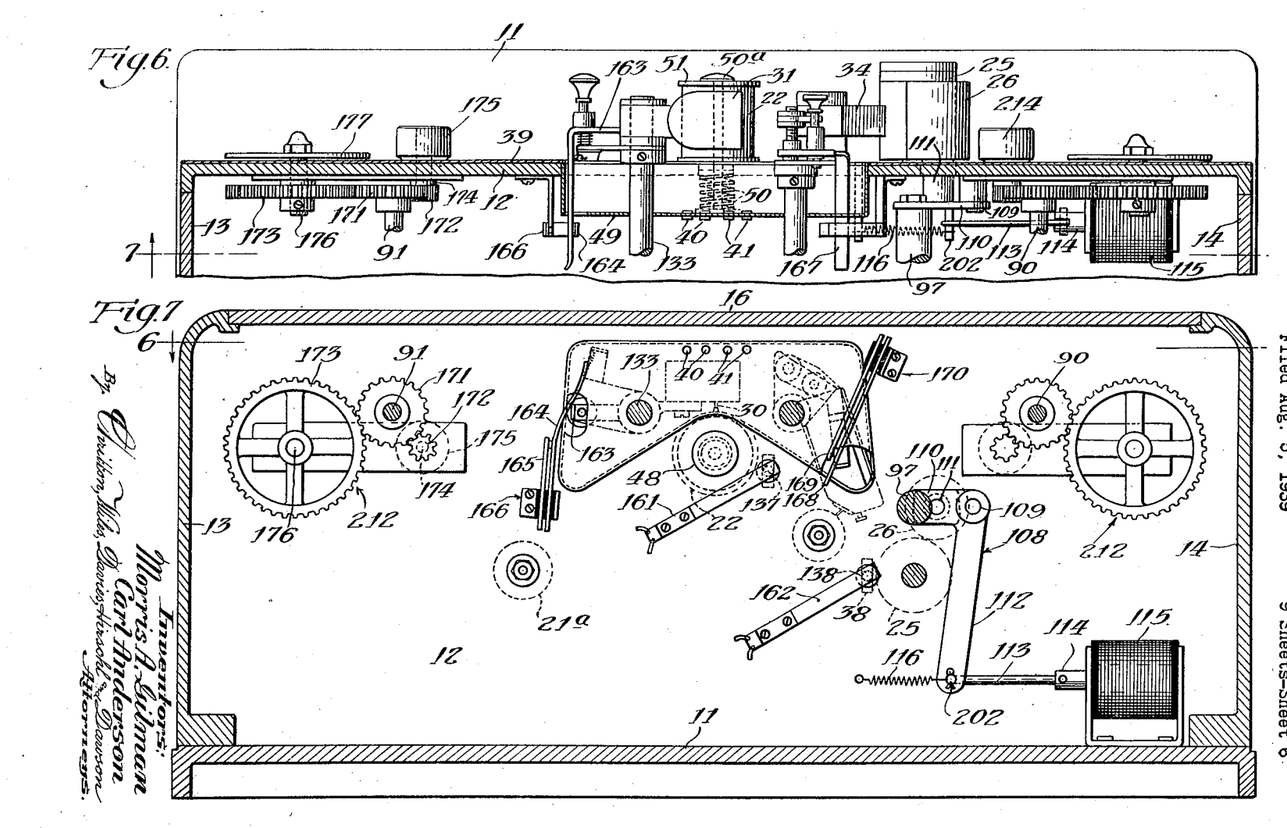
Fig. 6 is a fragmentary, horizontal sectional view taken along the line 6 of Fig. 7.
Fig. 7 is a longitudinal sectional view taken along the line 7 of Fig. 6.

Referring particularly to Figs. 6 and 7, the shaft 97 terminates near the front wall 12 and is connected to a bell crank 108 pivotally mounted on the front wall at 109, one arm 110 of the bell crank 108 being secured to the shaft 97 and being connected to the clutch roller 26 at 111. A depending arm 112 is attached to a rod 113 extending from the plunger 114 of the solenoid 115. A spring 116, attached at one end to the front wall 12 and at the other end to the pivot 202 for the rod 113 and depending arm 112, continuously urges the plunger out of the solenoid.

The step by step lateral shifting mechanism D includes two substantially identical mechanisms, as seen particularly in Figs. 5, 8, 9 and 10. One mechanism is connected to the reproducer 34 and the other to the recorder 31. For convenience only one mechanism will be described herein.

Figure 5:
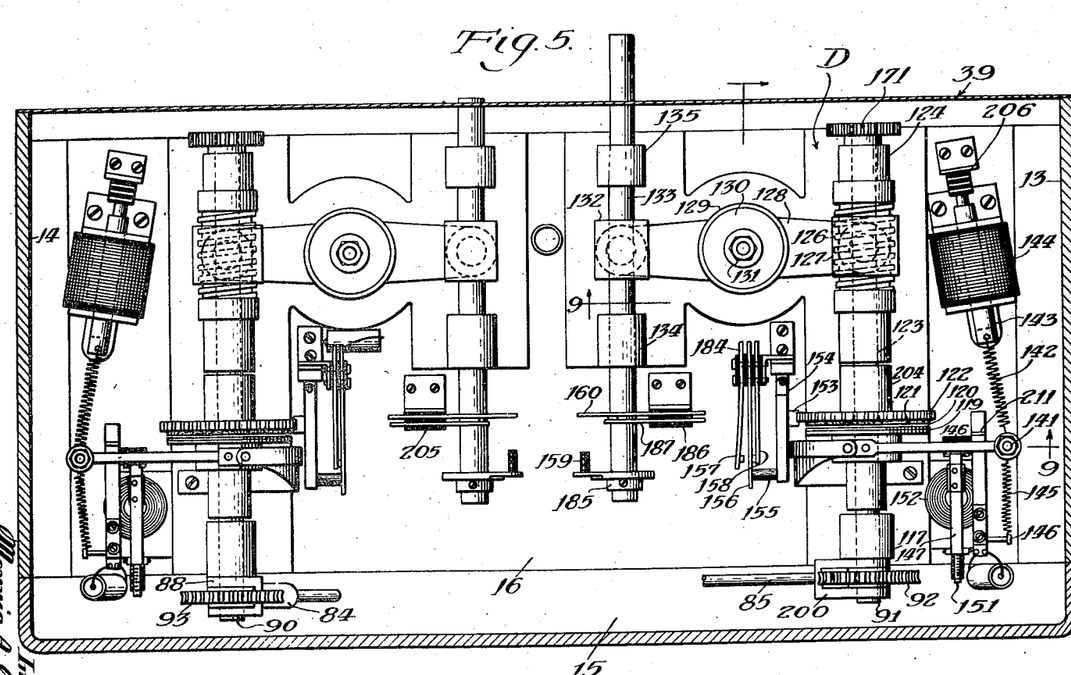
Fig. 5 is a horizontal sectional view taken along the line 5 of Fig. 1.

As previously described, the shafts 90 and 91 are continuously rotated when the motor 72 is in operation. The shaft 91 is journaled in the bearing 117 supported by the bracket 118 depending from the cover 16. A clutch plate 119 is mounted on the inner end of the shaft 91 and is provided with a friction surface 120. Opposing the friction surface 120 is the sanded or otherwise roughened surface 121 of the notched disk 122 carried by the shaft 123. The shaft 123 is supported by the bearings 124 and 204 in the brackets 125 and 205 on the cover 16 in alignment with the shaft 90.

A worm gear 126 on the shaft 123 meshes with a gear sector 127 carried by the lever 128. A support 129 provides a pivotal mounting for the lever 128, which is further fixed in position by the washer 130 and nut 131. At the opposite end the lever 128 is secured to a sleeve 132 on the arm 133, which is slidable in the bearings 134 and 135 to laterally shift the recorder mechanism 31 attached to the end of the arm 133. Since movement of the lever 128 causes variations in the distance between the points on the arm 133 and shaft 123 which are engaged by the lever, the lever is preferably slidably mounted at each end in any suitable manner.

Figure 9:
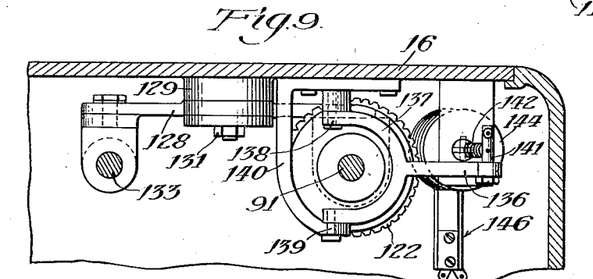
Fig. 9 is a fragmentary sectional view taken along the line 9 of Fig. 5.
Figure 10:
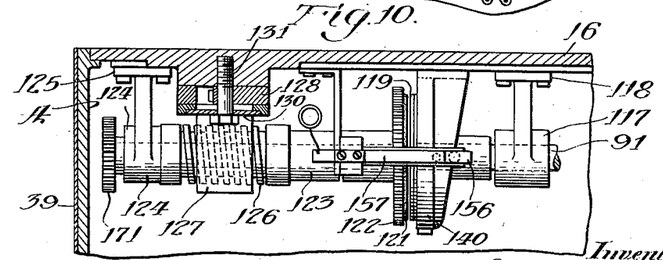
Fig. 10 is a fragmentary sectional view taken along the line 10 of Fig. 5.

The clutch plate 119, as seen in Fig. 9, is engaged by an arm 136 equipped with a U-shaped extension 137 pivotally mounted at 138 and 139 in the supporting bracket 140 which, in turn, is secured to the cover 16. Preferably the bracket 140 is so positioned that the arm 136 extends beyond the axis of the clutch plate, thereby permitting an eccentric action of the arm when engaging the clutch plate 119. To the other end of the arm 137 a pin 141 is attached, the pin serving as a base for the attachment of the spring 142. The opposite end of the spring 142 is secured to the plunger 143 of the solenoid 144. The pin 141 also serves as a mounting for the spring 145 attached at its other end to the fixed pin 146.

A bar 147 is equipped with a cut away portion on the under side of one end 148. The cut away portion at the end 148 normally extends beyond the arm 136, and the main portion of the bar 147 rests on the arm. However, when the arm 136 is moved forwardly towards the front wall 12, it becomes aligned with the cut away portion of the bar 147, which thereupon moves downwardly until the cut away portion is in engagement with the arm 136. The edge of the cut away portion in effect provides a flange which then prevents rearward movement of the arm 136 until the bar 147 is raised.

In this manner when the bar is in lower position in contact with the arm 136, it serves to prevent the arm from moving rearwardly and keeps the clutch plate 119 out of contact with the surface 121 of the notched disk 122. A supporting member 149, depending from the top wall 16, provides a pivotal mounting for the bar 147 intermediate its ends. The outer or rearward end of the bar 147 is provided with an extension 151 to which is secured a spring 150, urging the bar into yielding engagement with the arm 136.

The arm 136 also serves to make and break the circuit of the single contact switch 211 mounted adjacent the bar 147. When the arm 136 is moved to clutch engaging position, the switch is closed, to be opened again when the arm returns to the position shown in Fig. 5. The closing of the switch 162 energizes the solenoid 144 and causes the plunger 143 to be moved towards the front wall 12. The plunger 143 engages the strip 208, breaking the contact at 209 and closing the switch at 210. As the notch 188 in the film 21 passes the pin 38, opening the switch 162, the circuit for the solenoid 144 is broken. However, the closing of the contact 210, which occurs when the plunger 143 is advanced, serves also to energize the solenoid 144 and retain the plunger in advanced position.

When the plunger 143 is advanced, a tension is exerted on the spring 142, which is sufficiently strong to overcome the pull of the spring 145 and move the arm 136 into clutch engaging position. As the arm 136 moves forwardly, the bar 147 drops down and locks it in position, while at the same time the switch 211 is closed. When the arm 136 moves forwardly, the surface 120 of the plate 119 frictionally engages the surface 121 of the disk 122 and causes the disk and shaft 123 to rotate with the shaft 90.

The rotation of the shaft 123 rotates the worm gear 126 and moves the sector 127, lever 128, and arm 133 carrying the reproducer mechanism 34. As the reproducer mechanism 35 is lifted laterally of the film 21 the stylus 33 is moved to the next groove in the film. The rotation of the disk 122 causes the pin 153 to be forced from the notch in the disk 122, and the pin 155 engages the strip 156, closing the contact 157 and opening the contact 158.

By the opening of the contact 158 the solenoid 144 is deenergized and the tension on the spring 142 released. However, the cut away portion of the bar 142 prevents the spring 145 from returning the arm 136 to disengage the plate 119 and the disk 122. The deenergizing of the solenoid 144 permits the plunger 143 to return to its original position, opening the contact 210 (in series with the solenoid 144) and closing the contact 209 (in series with the solenoid 152).

When the pin 153 reaches the next notch in the disk 122, it is received therein, opening the contact 157 and closing the contact 158, and energizing the solenoid 152 which raises the bar 147 from the arm 136, permitting the arm 136 to move rearwardly under the urging of the sprnig 145. As the arm 136 moves rearwardly, the plate 119 and disk 122 become disengaged and the lateral shifting movement stops. At the same time the movement of the arm 136 permits the switch 211 to be opened, deenergizing the solenoid 152 and allowing the bar 147 to fall to its original position.

It will thus be seen that the solenoid 144 is energized when the switch 162 is closed and when the contacts 210 and 158 are closed simultaneously. The solenoid 152, on the other hand, is energized when the switch 211 and the contacts 209 and 158 are closed simultaneously.

The contact 157 is connected in series with the switch 213 on the front wall 12 and the solenoid 144. This circuit is used to position the stylus 30 of the recorder 31 a predetermined distance from the last groove. This is desirable, in order that the grooves be equidistantly spaced. If such an arrangement is not provided, when the recorder is manually moved to a new setting by the knob 214 a groove might be embossed in the wrong location on the film. To prevent such an occurrence it is necessary only to close the switch 213, which is normally open.

If the recorder 31 is in proper position, the pin 153 will be received within one of the notches in the disk 122, the contact 157 will be open, and the solenoid 144 will not be actuated. On the other hand, if the recorder 31 is not in proper position, the contact 157 will be closed, the solenoid 144 energized, and the lateral shifting mechanism operated until the pin 153 is received within the next succeeding notch in the disk 122.

A solenoid 152, supported by the top wall 16 above the bar 147, is adapted when energized to raise the bar 147 out of engagement with the arm 136.

The notched disk 122, carried by the shaft 123, is yieldingly engaged by a pin 153 on the member 154. The pin 153 is adapted to be received within the notches of the disk 122 when in alignment therewith. The member 154 is also equipped with another pin 155 projecting therefrom and engaging the strip 156 of a double switch 184. The strip 156 is adapted to be alternately brought into engagement with the contacts 157 and 158 of the switch. When the pin 153 is received within a notch in the disk 122, the strip 156 engages the contact 158. On the other hand, when the pin 153 is not aligned with one of the notches of the disk 122, the member 154 is moved away from the disk and the strip 156 is brought into engagement with the contact 157.

Adjacent the forward end of the plunger 143 of the solenoid 144 is a switch 206 (seen particularly in Fig. 8) carried by a supporting member 207. The switch 206 is provided with a resilient strip 208 adapted to engage the contact 209 or the contact 210. The strip 208 normally engages the contact 209, but is released from such engagement and brought into engagement with the contact 210 by the plunger 143.

By means of this shifting mechanism the stylus of the recorder 31 may be gradually moved laterally of the film to emboss an adjacent groove located a predetermined distance from the first groove. The corresponding shifting mechanism attached to the reproducer is seen particularly in Fig. 5.

The slidable recorder-carrying arm 133 is provided at its inner end with a pin 159 attached to a mounting 185 and adapted to be brought into engagement with the strip 160 of a switch 186, moving the strip 160 away from the contact 187. As the shifting mechanism is operated, the arm 133 moves laterally across the film and brings the pin 159 closer to the front plate 12 and the strip 160. The mounting 185 is so positioned on arm 133 that the pin 159 does not engage the strip 160 until the reproducer has been laterally shifted across eighty grooves in the film 21. It is apparent that this arrangement may be varied, but it is usually desirable in this type of apparatus to provide for not more than eighty grooves in a single film ribbon.

The film 21 may be provided with a cut away portion 188 (Fig. 12) at one side, which is adapted to engage the pins 137 and 138 of the plate 39 and to make and break the contacts in the switches 161 and 162, as seen particularly in Fig. 7. The switch 162 is connected in a circuit which provides for the actuation of the lateral shifting mechanism just described. The other switch 161 adjacent the recorder mechanism causes the actuation of the other shifting mechanism corresponding to the mechanism just described.

The recorder 31, which is pivotally mounted at 32, is provided with a rearwardly extending arm 163 carrying a strip 164 which engages the contact 165 of the switch 166. This switch, which is open when the stylus of the recorder is not in engagement with the film 21, prevents the actuation of the shifting mechanism D and the energizing of the light bulb 36 when the recorder is not actually in operation. The reproducer 34 is similarly provided with an arm 167 and a strip 168 engaging the contact 169 of the switch 170, which prevents the operation of the corresponding reproducer shifting mechanism when the stylus 33 is not in engagement with the film 21.

The shaft 123 is equipped at its end adjacent the front wall 12 with a gear 171 meshing with the gears 172 and 173. The gear 172 is carried by a shaft 174 passing through the wall 12 and being equipped at its exposed end with a knob 175 which is adapted to be manually turned to operate the shifting mechanism. The gear 173 is mounted on the shaft 176 extending through the front wall 12 and carrying outside the housing 10 a calibrated disk 177 which shows the extent of the lateral shifting of the stylus 33 along the film 21. Preferably each unit 180 as marked on the disk 177 indicates the lateral movement of the stylus from one groove to the next adjacent groove and corresponds to a shift of the pin 153 to the next adjacent notch in the disk 122. Similar equipment, indicated generally by the numeral 212, is provided for the reproducer 31.

A switch 189 may be mounted on the front wall 12 to operate the motor 72 or to energize the solenoid 115, or both. It is preferable, however, to provide separate means (not shown) for energizing the solenoid 115.

Figure 8:
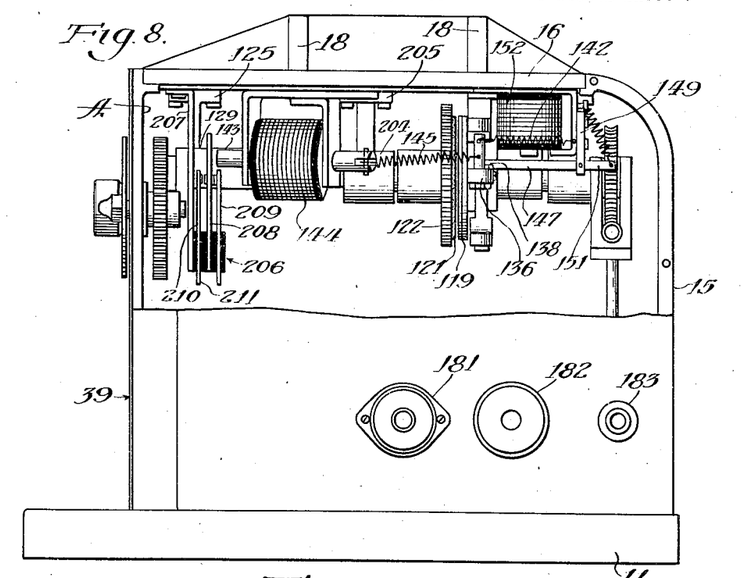
Fig. 8 is an end elevation with a portion of the end wall of the housing broken away to show the shifting mechanism.

As seen particularly in Fig. 8, one of the end plates 13 is provided with a series of apertures 181, 182 and 183 to permit the electrical connections to be brought into the housing.

Figure 16:
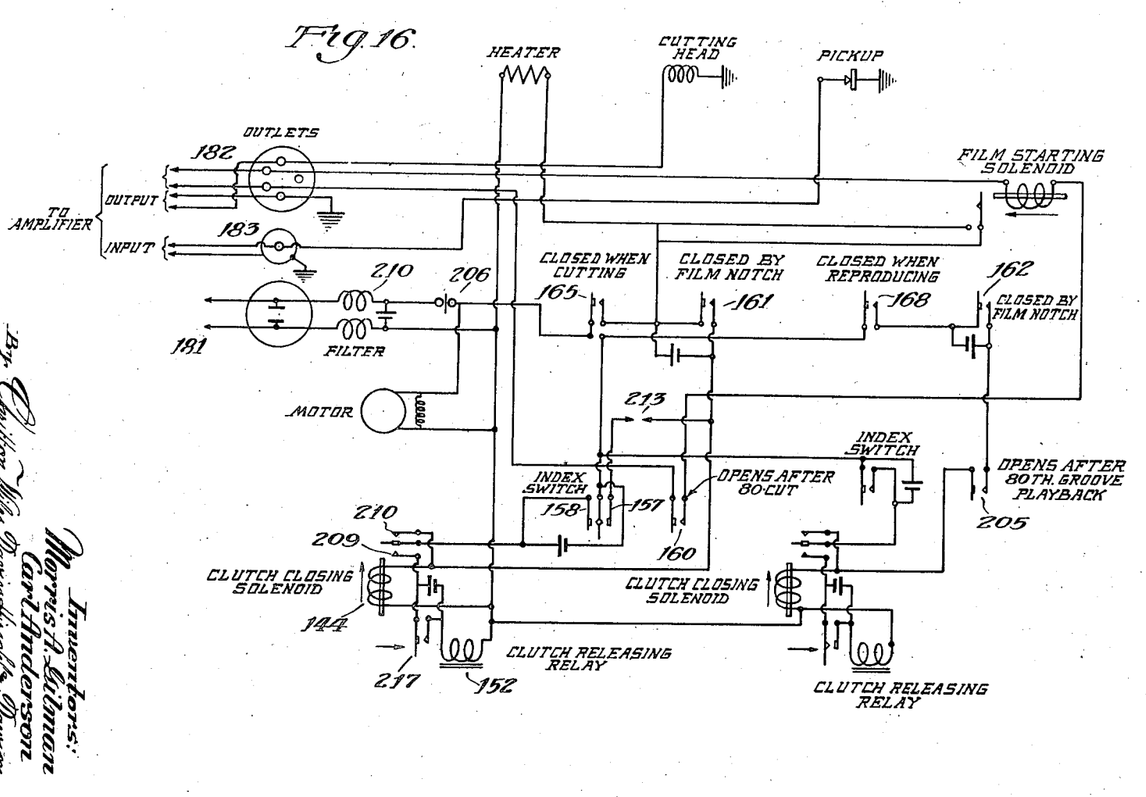
Fig. 16 is a diagrammatic representation of the electrical circuit used in our invention.

Fig. 16 is a diagrammatic representation of the electrical circuit used in connection with our improved mechanism. Since the elements of this circuit have been labeled in accordance with the preceding description, it is believed unnecessary to further describe the circuit except in connection with the operation of the mechanism.

Operation

As previously stated, the film 21 passes from the feed mechanism B along the idling roller 21ª, the anvil 22, the stationary roller 23, the supporting roller 24, the drive roller 25 and clutch roller 26, and then returns to the feed mechanism B. Wipers 27 and 28 remove from the film any particles of dust or dirt which may have accumulated thereon because of the static charge of electricity acquired by the film.

When the motor 72 is set in operation, the drive roller 25 is continuously rotated. When, in addition, the solenoid 115 is energized, the bell crank 108 is moved to bring the surface 100 of the roller 96 into engagement with the antifriction surface 95 of the roller 94, thereby rotating the shaft 97, the pulley 99, the pulley 102, and the hollow shaft 57. The rotation of the hollow shaft causes the plate 56 to rotate within the casing 52 and to feed the film out over the guide 58 of the reel 54. At the same time the clutch roller 26 is brought into engagement with the drive roller 25, and the film is caused to pass along the path previously described.

It will be noted that the rotation of the plate 56 occurs only in cooperation with the engagement of the clutch roller with the drive roller 25.

Thus the operation of the feed mechanism B is synchronized with the operation of the drive mechanism D which passes the film through the recorder and reproducer mechanisms.

When one complete revolution of the film through the recorder or reproducer mechanism has taken place, the appropriate switch 161 or 162 is closed by contact of the cut away portion 188 of the film 21 with the pin 37 or the pin 38, thus causing the lateral step by step shifting mechanism to be set into operation.

The step by step lateral shifting of the reproducer or recorder mechanism continues until eighty or other predetermined number of steps have been reached. At this point the switch 185 acts to deenergize the solenoid 155 and stop the operation of the machine.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

We claim:

1. In apparatus of the character set forth provided with a sound mechanism equipped with a stylus for engaging sound film, a reel for carrying an endless ribbon of sound film comprising a central support member adapted to receive a plurality of layers of film thereabout, said layers being in a substantially horizontal plane, a rotatable horizontal disc mounted beneath said layers of film and frictionally engaging the lower edges thereof, a film carrying guide member secured to said support member and projecting therefrom in a plane transverse to said first-mentioned plane, said guide member being turned to project at its end in a plane substantially parallel to said first-mentioned plane, means for guiding said film from said mechanism to the outer layer on said support member, a cover member extending over layers of film and supported thereabove, means carried by said cover member and engaging the upper edges of said layers of film to maintain the same in alignment, a plurality of rollers depending from said cover member and arranged to engage the periphery of the outer layer of film, said rollers being radially adjustable with respect to said cover member, and means for rotating said disc to feed the inner layer of film from said reel.

2. In apparatus of the character set forth provided with a sound mechanism equipped with a stylus for engaging sound film, a film feeding and driving mechanism comprising an arcuate central support member adapted to receive a plurality of layers of film thereabout, said layers being in a substantially horizontal plane, a film carrying guide member secured to said support member and projecting therefrom in a plane transverse to said first-mentioned plane, said guide member being turned to project at its end in a plane substantially parallel to said first-mentioned plane, means for guiding said film from said mechanism to the outer layer on said support member, a rotatable plate disposed beneath said support member and adapted to frictionally engage the lower edges of the layers of said film, a cover member extending over said layers of film, means carried by said cover member for engaging the upper edges of said layers of film to maintain the same in alignment, a plurality of rollers depending from said cover member and arranged to engage the outer periphery of the outer layer of said film, said rollers being radially adjustable with respect to said cover member, means for providing a path for said film along said mechanism between said guide member and said guide means, a drive roller disposed along said path for frictionally engaging the film to move the same along the path, and single power means for synchronously and simultaneously rotating said drive roller and said plate to feed the film from the inner layer thereof along said path and for returning the same to said outer layer.

3. In apparatus of the character set forth, a reel for carrying an endless ribbon of sound film or the like, comprising a central support member adapted to receive a plurality of layers of film thereabout, said layers being disposed in a substantially horizontal plane, a rotatably horizontal plate mounted beneath said layers of film and frictionally engaging the lower edges thereof, a film carrying guide member secured to said support member and projecting therefrom in a plane transverse to said first-mentioned plane, said guide member being turned to project at its end in a plane substantially parallel to said first-mentioned plane, means for guiding said film to the outer layer on said support member, a cover member extending over the layers of film and supported thereabove, means carried by said cover member and engaging the upper edges of said layers of film to maintain the same in alignment, means carried by said cover member and depending therefrom for engaging the periphery of the outer layer of film, said last-mentioned means being readily adjustable with respect to said cover member, and means for rotating said plate to feed the inner layer of film from said reel.

MORRIS A. GILMAN.
CARL ANDERSON.